(No Model.) 3 Sheets—Sheet 1.
J. R. RUDE & H. G. SWOPE.
SEEDING MACHINE.
No. 285,845. Patented Oct. 2, 1883.
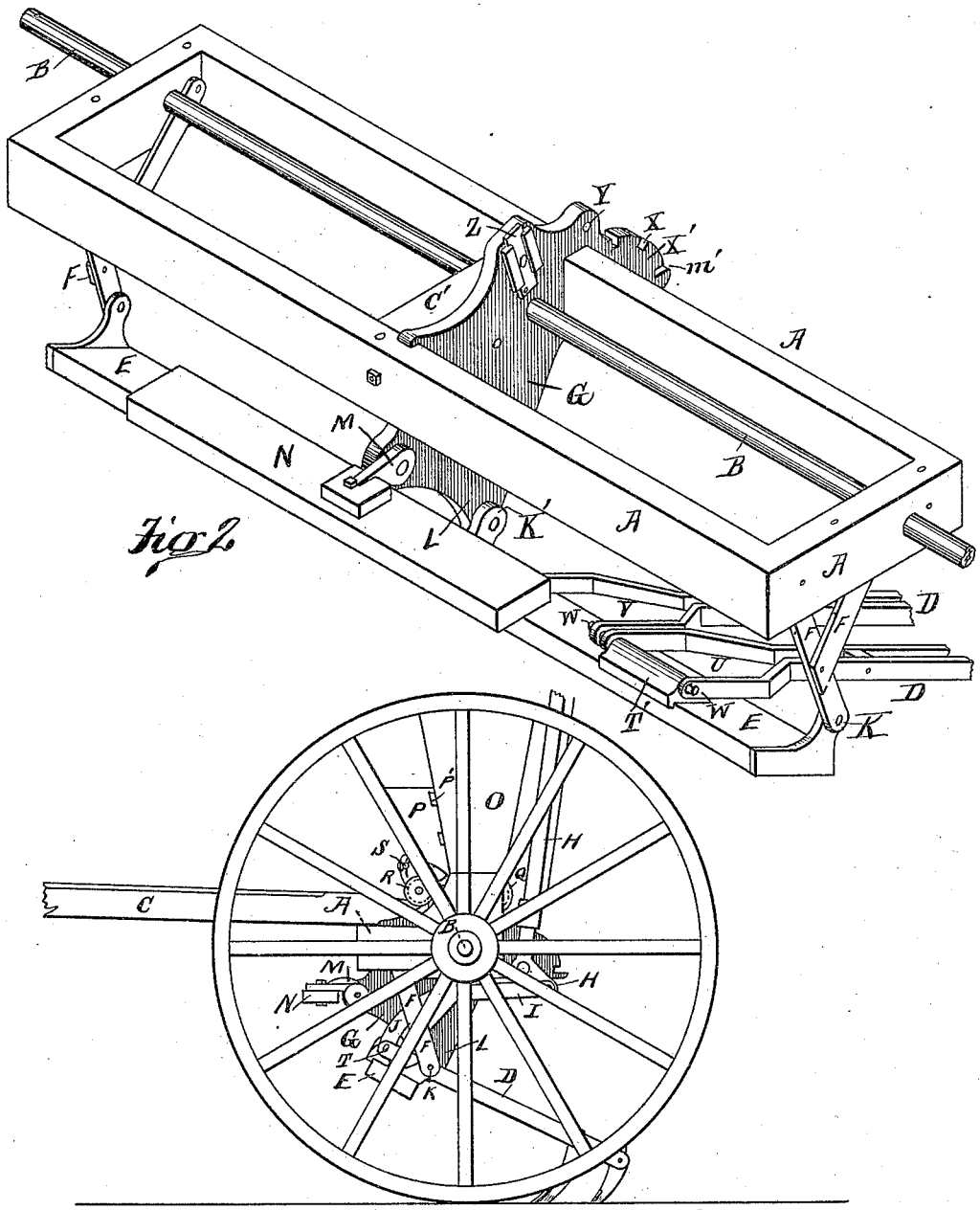
WITNESSES:
John R. Woods
L. P. Cleaver
INVENTORS
John R. Rude
Horace G. Swope
by James W. See
ATTORNEY (No Model.) 3 Sheets—Sheet 2.
J. R. RUDE & H. G. SWOPE.
SEEDING MACHINE.
No. 285,845. Patented Oct. 2, 1883.
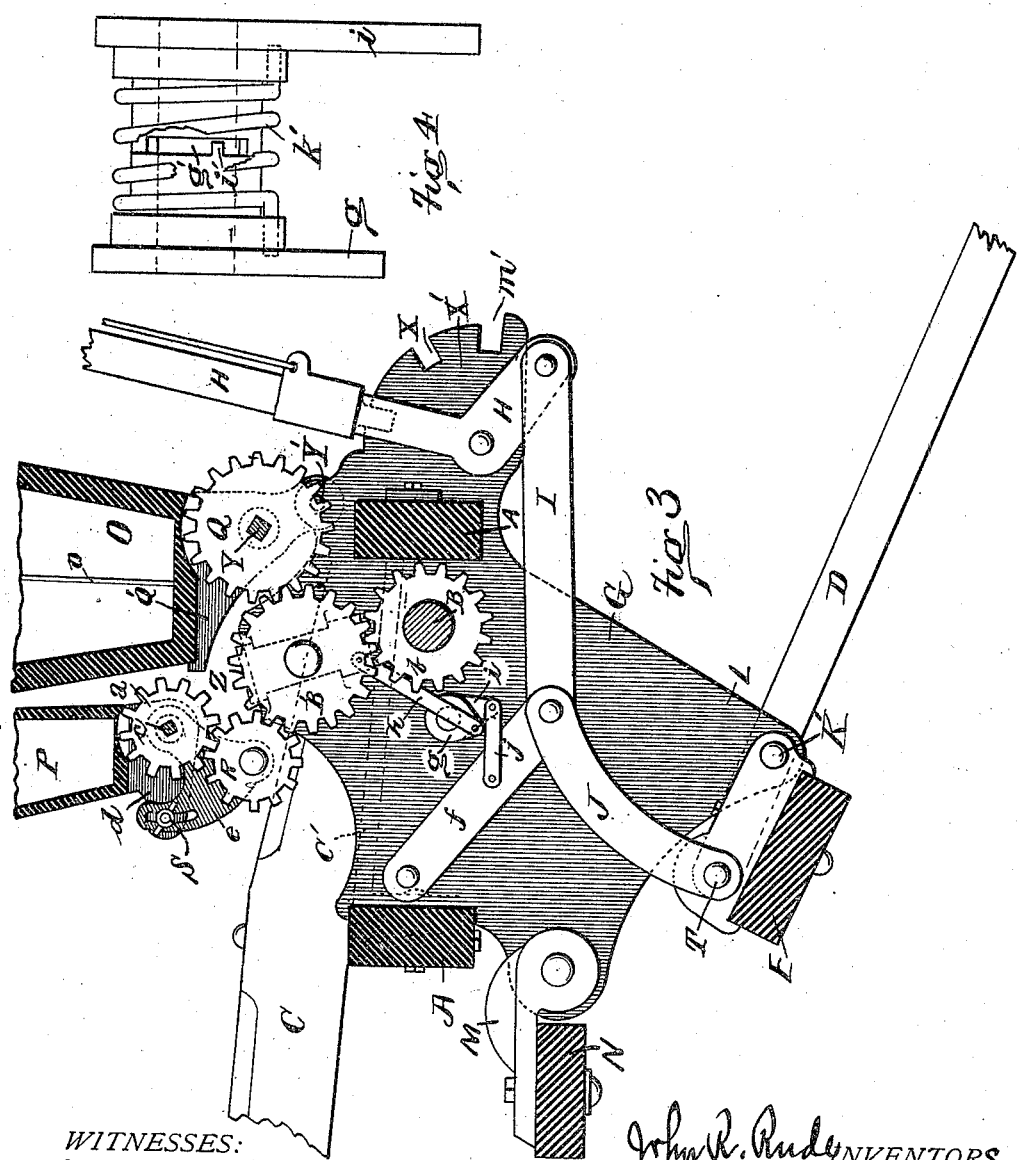
WITNESSES:
INVENTORS
ATTORNEY

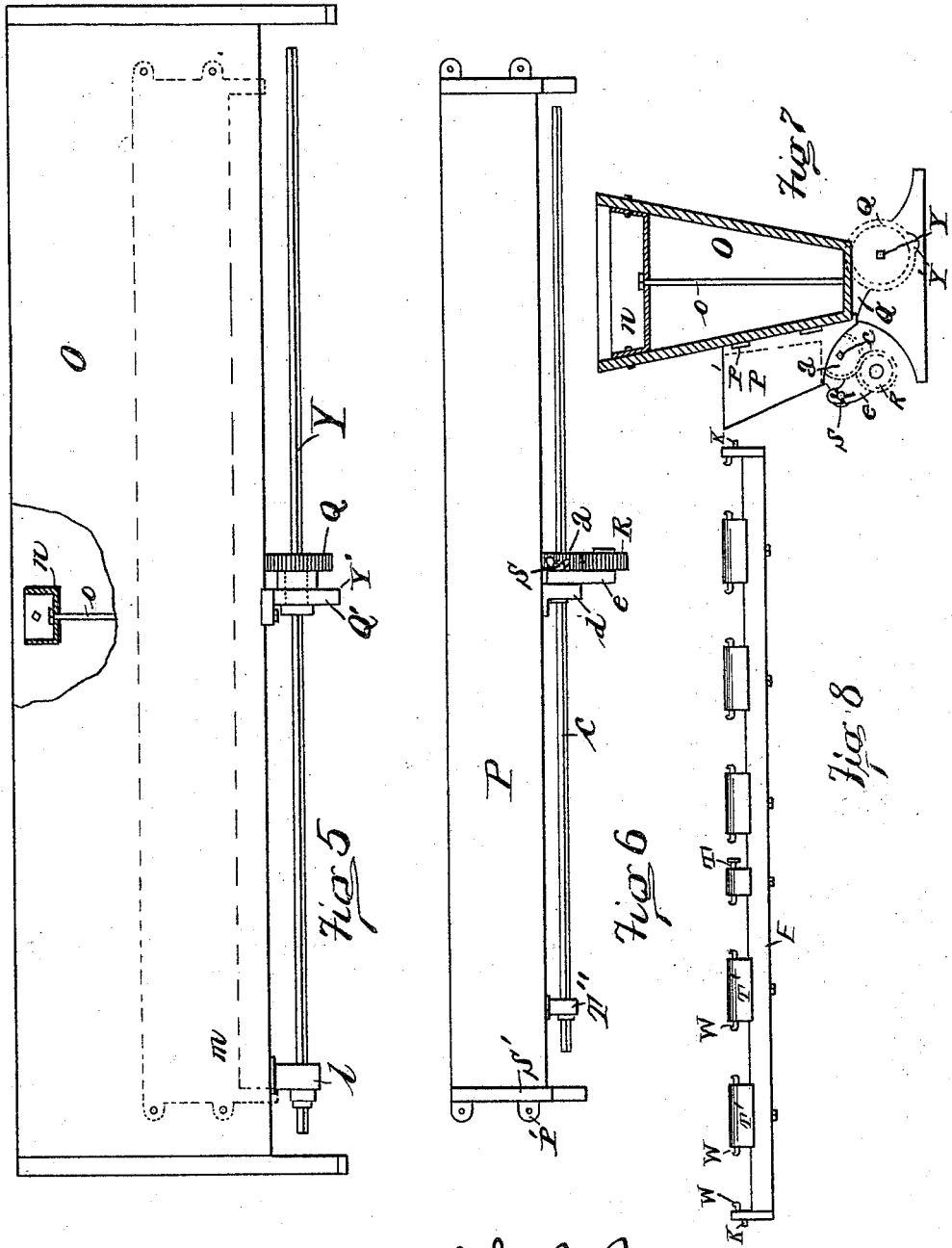

UNITED STATES PATENT OFFICE.

JOHN R. RUDE AND HORACE G. SWOPE, OF LIBERTY, INDIANA, ASSIGNORS TO RUDE BROTHERS MANUFACTURING COMPANY, OF SAME PLACE.

SEEDING-MACHINE.

SPECIFICATION forming part of Letters Patent No. 285,845, dated October 2, 1883.

Application filed October 17, 1882. (No model.)

*To all whom it may concern:*

Be it known that we, JOHN R. RUDE and HORACE G. SWOPE, of Liberty, Union county, Indiana, have invented certain new and useful Improvements in Seeding-Machines, of which the following is a specification.

This invention pertains to that class of seeding-machines in which a wheeled frame carries a seed-box and drags a series of soiling-shovels, the seed-delivering mechanism being operated from the main-frame wheels, and the soiling-shovels being arranged to be lifted from the soil, when desired, by means of a lever, such lifting of the shovels serving, also, to throw out of action the feeding mechanism, a grass-sowing device being combined with the other parts of the machine.

In machines of this class our invention relates to the means for attaching the shovel drag-bars, to the means for lifting the same, to the means for driving the seeding and grass-sowing mechanism, to the means for throwing the seeding mechanism out of action, to the means for applying the draft of the team, and to the means for uniting the grass-seed box to the main box, as hereinafter set forth and claimed.

In the accompanying drawings, Figure 1 is a side view of a seeding-machine embodying our improvements; Fig. 2, a perspective view of the main frame and its immediate attachments; Fig. 3, a vertical transverse section of the machine; Fig. 4, an elevation of relief-cranks; Fig. 5, a front view of the seed-box; Fig. 6, a front view of the grass-seed box; Fig. 7, a transverse vertical section of the seed-box, and Fig. 8 a front view of the rock-bar.

A is the main frame of the machine; B, the axle for the main wheels; C, the tongue; D the drag-bars of the soil-shovels; E, the rock-bar, pivoted below the main frame; F, hangers at each end of the main frame, to support the end pivots of the rock-bar; G, a housing attached to the main frame, at about its center of length, as shown; H, hand-lever at rear of machine, to lift drag-bars and throw feed out of action; I, a bar from lever H, reaching in under main frame; J, a link from inner end of bar I to free edge of the rock-bar E; K, end pivots of the rock-bar in hangers F; K', center pivot-bearing of rock-bar in hanging portion L of housing G; M, a clevis pivoted to a forwardly-projecting portion of housing G; N, the double-tree; O, the seed-box; P, the grass-seed box; Q, the seed-box-shaft gear; Q', a housing for gear Q, being bolted beneath the seed-box at about the middle of its length; Y, the usual seed-box shaft; $l$, one of the usual seed-cups on shaft Y; $c$, the usual grass-seeder shaft; $a$, a gear on said shaft; $d$, a housing for gear $a$, being bolted under center of grass-seed box; $e$, a sector pivoted to housing $d$; R, an idle-gear carried by sector $e$ and meshing into gear $a$; S, a screw to bind sector $e$ to housing $d$; $b$, a gear on axle B, in same plane with all the other gears; Z, a plate fitted to slide freely in jaws on housing G; B', an idle-gear journaled on a stud in plate Z, said gear meshing into gears $b$, Q, and R, and adapted by the sliding of plate Z to be disengaged from gear $b$; $f$, a link with its one end pivoted to a point in housing G, and its other end joining at the juncture of link J and bar I, and forming with them a toggle system; T, the axial point at which link J attaches to rock-bar, also axial point of attachment of the drag-bars to the rock-bar; T'', one of the usual grass-seed cups on shaft Y; T', pivot-castings bolted to rock-bar to receive drag-bars; U, fork of drag-bars straddling pivot-blocks T'; V, fork of drag-bars situated between pivot-blocks T'; W, pivots of the blocks T'; X, intermediate notch in sector X' for detent of lever H; Y', a bolting-point for binding housing Q' of the seed-box to the housing G; $g$, a crank pivoted on face of housing G; $h$, a bar from crank $g$ to slide Z; $i$, a crank united flexibly with crank $g$ upon same axis; $j$, a bar connecting crank $i$ to a pivot-point on link $f$; $g'$, Fig. 4, a gap in the contacting-surface of the hubs of cranks $g$ and $i$; $i'$, a dog on one of the hubs to work in said gap and contact with the ends of the gap, as one of the cranks is oscillated with reference to the other; $k'$, a spring uniting cranks $i$ and $g$, tending to hold them in a position with dog $i'$ against one end of gap $g'$, but permitting the cranks to oscillate, under strain, independent of each other; $n$, a bridge across the inside and top of seed-box, being bolted to the sides of the box; $o$, a bolt vertically through bridge $n$, through seed-box, and through housing Q' under the seed-box; C', a rib on rear side of housing G, to receive the tongue; S', end pieces of grass-seed box; P', lugs on same for attaching to side of seed-box.

The seed-cups $l$ and T" are to be arranged in a series, as usual. The seed-box shaft Y is independent of any bearings in the end pieces of the seed-box. The mechanism of the seed-box is self contained, and when the seed-box is set in place the gear Q engages properly with gear B' of the housing. The power is applied at the center of the length of the shaft Y, thus reducing the angle of torsion. The bolting at Y' serves to bind the seed-box at the center of its length to the housing G. The bridge-piece $n$ and bolt $o$ serve to truss the seed-box at its center. The grass-seed shaft is also driven by gear at its center, and the shaft is independent of the end pieces of the box. The grass-seed box P is a self-contained structure simply attached against the face of the seed-box O. As an attachment, it may be applied at any time without change in the seed-box. The sector $e$ and screw S permit the grass-seeding shaft to be fixed out of action by raising gear R and tightening screw S. When grass-seeder is in action, the screw S, being loose, permits the gear R to lift out of gear automatically when the machine is backing, and to re-engage when the machine goes ahead again.

The central housing, G, is shown as in one piece, but may, if desired, be formed of several pieces, properly united. This housing serves to stiffen the machine at its center, to furnish a central pivot-bearing at K' for the rock-bar E, to furnish a draft-point for the clevis M, to furnish a central bearing for the axle B, to furnish a pivot-bearing and detent-segment for lever H, to furnish an abutment for the toggle system for the rock-bar, and to furnish a housing for the gears $b$ and B'. The rock-bar lifts the drag-bars D in the usual manner, but the means for rocking the bar are original with us. The hand-lever H operates the toggle system and rocks the bar E upon its axis K K' in an obvious manner, the strains being applied at the center of the bar's length. When lever H is brought to intermediate detent-notch, X, the soil-shovels are lifted from the ground and retained in their idle position. When the lever is brought to notch $m'$, the drag-bars and shovels are lifted slightly more, but without any special object, so far as their increased lift is concerned. The real object will be hereinafter set forth.

The slide-plate Z, carrying the gear B', is arranged to move the gear B' in and out of gear with the axle-gear $b$, so as to throw in or out of action the seeding devices. The plate Z slides tangent to a circle struck from center of gear Q, so that the movement does not materially affect the meshing of gears B' and Q. The sector $e$ being free to swing, the gear R may rise and fall to suit the movement of gear B'. The double crank $g$ $i$ is connected by link $h$ to slide Z, and by link $j$ to the toggle-link $f$. Thus, when the toggle is actuated, the cranks will be oscillated, and the gear B' be moved up out of engagement with gear $b$. During the initial movements of the toggle the slide Z will not be affected, owing to the links $j$ and $h$ being set to pass the centers during the early portion of their movement. As a consequence of this arrangement the lever H may be set at notch X, and the drags lifted free from the ground without disengaging gear B' or stopping the seeding operation. Setting lever H at final notch $m'$ lifts the drags a trifle farther, and throws the gear out of engagement and stops the seeding. The object of this is to permit seed to be delivered in certain soils where it is not desirable at once to work the seed into the soil by means of the soil-shovels, subsequent harrowing being preferred. The machine may sow, as usual, with the shovels down and at work, and, upon reaching wet or frozen spots, the shovels may be lifted and the sowing continued, the spots being afterward harrowed when in proper condition.

Sometimes, in throwing in the gearing, the gear B' may ride on top of the teeth of gear $b$. To provide for this the cranks $i$ and $g$ are united flexibly, as hereinbefore set forth. A flexible strain is thus brought upon slide Z sufficient to hold the gear properly in engagement, but still permitting the teeth to hunt for position while being thrown into engagement.

The drag-bars D are constructed, as usual, of two bars spread into a fork at their front ends. Their front ends are usually united to the rock-bar by staples. In our machine castings T' are bolted to the rock-bar in the fork of alternate drag-bars, and the drag-bars, straddling the blocks T', are pivoted upon the hook-headed studs W, cast on the blocks. The intermediate drag-bars hook to the blocks, between which they lie. In construction the work of setting the drag-bars proceeds from one end of the rock-bar, the drag-bars, &c., being placed in position successively, like adding link to link of a chain.

We call our machines "central geared," to distinguish them from machines in which the gearing is located at or near the end of the machine.

We claim as our invention—

1. The combination, with the series of forked drag-bars and the draft-bar to which they are attached, of the pivot-blocks T', having studs W, substantially as set forth.

2. The combination, with the main frame, the pivoted draft-bar, and the hand-lever, of the double-linked toggle, with its lower end attached to the pivoted draft-bar, and its upper end attached to or connected with the main frame, and the connecting-bar attached to the central pivot of the toggle and pivoted to the hand-lever, substantially as specified.

3. The combination of the drag-bars, their pivoted draft-bar, the hand-lever, the toggle system, the seed-shaft gear, the axle-gear, the sliding gear B', the slide Z, the cranks $g$ and $i$, and the links $h$ and $j$, substantially as set forth.

4. The combination of the drag-bars, their pivoted draft-bar, the hand-lever, the toggle system, the gears Q $b$ $a$ R B', slide Z, cranks $g$ $i$, links $h$ $j$, and sector $e$, substantially as set forth.

5. The combination of gears $b$ and B', cranks $g$ and $i$, and spring $k'$, substantially as set forth.

6. The combination of main frame A, central housing, G, seed-box O, housing Q', and bolt Y', substantially as set forth.

7. The combination of main frame A, central housing, G, and rock-bar E, having bearing K', substantially as set forth.

8. The combination of main frame A, central housing, G, and clevis M, substantially as set forth.

9. The combination of main frame A, central housing, G, and axle B, journaled in housing G, substantially as set forth.

10. The combination of main frame A, central housing, G, and sector X', substantially as set forth.

11. The combination of main frame A, central housing, G, and tongue-seat C', substantially as set forth.

12. The combination of main frame A, central housing, G, gears $b$ and B', and slide Z, substantially as set forth.

13. The combination of main frame A, central housing, G, seed-box O, bridge $n$, and bolt $o$, substantially as set forth.

JOHN R. RUDE.
HORACE G. SWOPE.

Witnesses:
B. F. CLARK,
JAS. O'TOOLE.